340-870.14 SR
OR 3,357,006
ELECTRONIC MEANS FOR REPETITIVELY DISPLAYING ANALOG SIGNALS UPON A DISPLAY DEVICE
Filed Sept. 8, 1964 2 Sheets-Sheet 1
FIG. 1
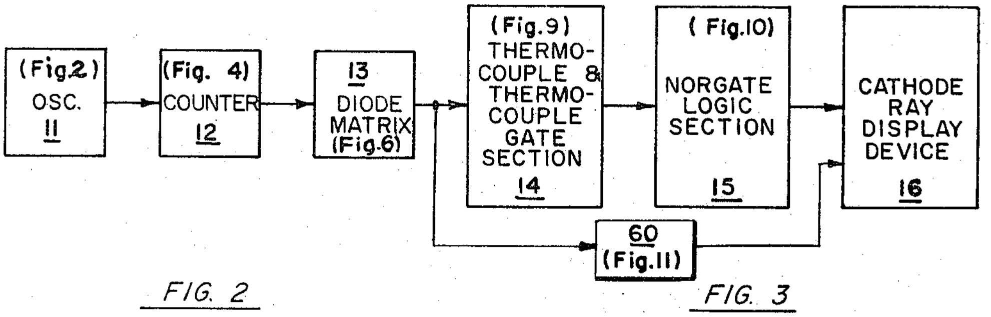
FIG. 2
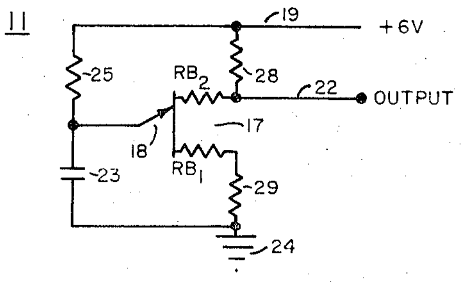
FIG. 3
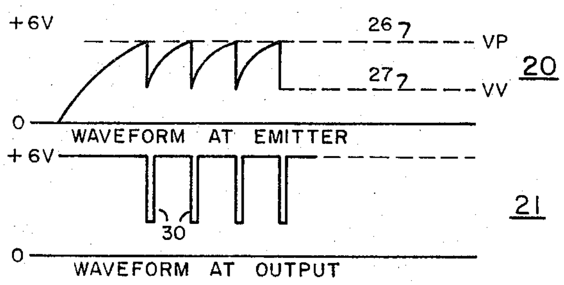
FIG. 4
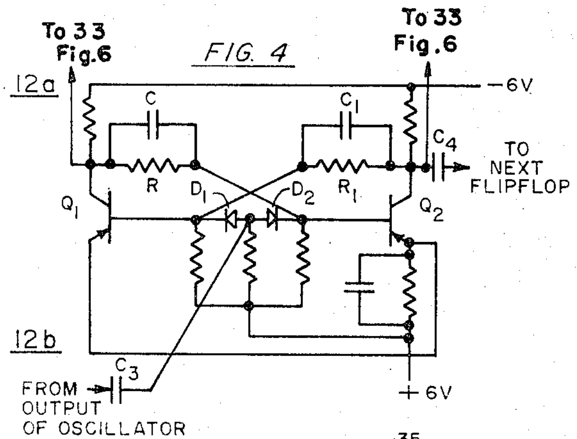
FIG. 5
INPUTS
| PULSE | $Q_1$ | $Q_2$ | $Q_3$ | $Q_4$ |
|---|---|---|---|---|
| 1 | 1 | 0 | 0 | 1 |
| 2 | 0 | 1 | 1 | 0 |
| 3 | 1 | 0 | 1 | 0 |
| 4 | 0 | 1 | 0 | 1 |
FIG. 6
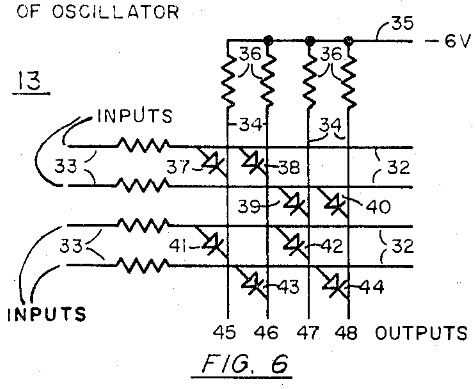
FIG 7
INPUTS
| PULSE | A | B | C | D |
|---|---|---|---|---|
| 0 | 0 | 1 | 0 | 1 |
| 1 | 1 | 0 | 0 | 1 |
| 2 | 0 | 1 | 1 | 0 |
| 3 | 1 | 0 | 1 | 0 |
WALTER WISNIEFSKI
*INVENTOR.*
BY Fred S. Valles Dec. 5, 1967 W. R. WISNIEFSKI 3,357,006
ELECTRONIC MEANS FOR REPETITIVELY DISPLAYING ANALOG SIGNALS UPON A DISPLAY DEVICE
Filed Sept. 8, 1964 2 Sheets-Sheet 2

WALTER WISNIEFSKI
INVENTOR.
BY
Fred S. Valles 3,357,006
ELECTRONIC MEANS FOR REPETITIVELY DISPLAYING ANALOG SIGNALS UPON A DISPLAY DEVICE Walter R. Wisniefski, Paterson, N.J., assignor to Rexall Drug and Chemical Company, Los Angeles, Calif., a corporation of Delaware Filed Sept. 8, 1964, Ser. No. 394,844
3 Claims. (Cl. 340—183)

ABSTRACT OF THE DISCLOSURE

The instant invention teaches an all electronic system for sequentially coupling the outputs of sensing devices to a display device. An oscillator operating at a constant repetition rate is utilized to drive a multi-stage electronic counter. The outputs of the counter are coupled to a diode matrix which functions to produce only one binary ONE output at its output terminals at any given instant and operates sequentially to produce a binary ONE output at each of its output terminals and to repeat this sequence continuously. The outputs of the diode matrix are impressed upon respective inputs of associated gating circuits each of which have an analog sensing device as its load circuit. As each gate is enabled the impedance of the analog sensing device controls the strength of the output signal developed by the gating circuit which, in turn, is applied through a NOR gate to the input of a display device such as, for example, a cathode ray oscilloscope. Appropriate synchronization of the system is obtained by coupling the sweep circuit of the display device to the diode matrix to be assured that the beginning of each sweep is accurately controlled.

The instant invention relates to switching means, and more particularly to electronic solid state switching means for use in sequentially portraying a plurality of data in the form of pulses in an oscilloscope device and for synchronizing the selection of data with the operating rate of the oscilloscope display device.

The substantially simultaneous display of data collected from a plurality of remote points at one central location is an extremely advantageous procedure which aids in the monitoring and control of a complex network. As one example, in a polymerization reactor, it is extremely important to be able to observe the temperature levels at a plurality of points within the reactor. It is also extremely advantageous to be able to observe such temperature levels on a continuous basis and to portray the data in a small area so as to simplify the observation of such data and thereby facilitate the speed at which corrective measures may be taken based on such observations.

At present, a typical arrangement for observing such information is comprised of providing a thermo-couple device at each remote location in the reactor system for which it is desirable to observe temperature level information. A mechanical switch sequentially gates the voltage level at each thermo-couple device to the input of an oscilloscope display device or cathode ray tube display device having a transparent member aligned with the face thereof with gradations provided in the transparent member which represent units of temperature and which cooperate with the pulses presented by the cathode ray tube device to simply and readily observe the temperature level at each remote point in the reactor system. The mechanical switching means continues to cycle providing sequential sweeps of the thermo-couples at each remote location in order to provide substantially continuous output information of these remote locations.

The mechanical switching means presently employed has been found to have numerous disadvantages. These mechanical switches are extremely difficult to maintain and require regular maintenance which is comprised of taking a mechanical switch apart at frequent intervals in order to clean the elements thereof to insure proper operation of the mechanical switch means. The mechanical switch means has been found to introduce electrical noise into the switching operation causing an unsteady display in the cathode ray tube device. In addition thereto, the peaks of the signal pulse display undergo constant bouncing and the display undergoes a tearing effect. A tearing effect is where the display momentarily distorts in the horizontal or vertical plane or both.

The instant invention replaces the mechanical switch means used in such display systems and overcomes all the above disadvantages of the mechanical switching means, while at the same time providing extremely reliable operation over an extremely long, useful operating life.

The instant invention is comprised of oscillator means having an oscillating frequency which is compatible with the sweep rate of the cathode ray display device. The output of the oscillator means is impressed upon a multi-stage counter, each stage of the counter being comprised of a bi-stable flip-flop device. The outputs of the flip-flop stages in the counter device are impressed upon a diode matrix means having a plurality of input terminals, each connected with an associated flip-flop stage and a plurality of output terminals which are selectively connected to predetermined ones of the input terminals through diode means so as to place only one of the output terminals at a binary 1 level while all the remaining output terminals of the diode matrix are at the binary zero level.

Each output terminal of the diode matrix is electrically connected to gating means which, in turn, are connected to an associated thermo-couple device. The gating means are controlled by the diode matrix in such a way that the gating means associated with the diode matrix output terminal, which is in the binary 1 state, will be opened while the remaining gating means remain closed. In accordance with the manner in which the diode matrix has its diode means connected, the voltage levels of the thermocouple devices may be read out in any desired sequence. After the counting means reaches its maximum cumulative count, it will continue to recycle, thereby continuously sweeping the thermocouple devices through each cycle of the counting means which is, in turn, controlled by the oscillator means.

The outputs of a predetermined group of thermo-couple gating means are coupled through a NOR gate to the input of the cathode ray display device. By proper adjustment of the oscillator means its operating frequency may be set to be synchronous with the sweep frequency of the cathode ray display device so that all pulses representing the thermo-couple voltage levels which, in turn, are represented in the temperature levels, may be displayed within one sweep of the cathode ray display device.

Since it is desired to connect one side of each thermocouple device in common and to connect each common point to ground, it has been found that by grounding the positive side of each thermo-couple device and connecting the negative side to gate means, each being comprised of the P-N-P transistor that no interaction of the thermo-couple devices will result therefrom and that suitable display results are obtained.

The electronic solid state switch means of the instant invention having no moving mechanical elements does not require any periodic maintenance of the type required in mechanical switching devices presently being used, and has been shown to afford an extremely steady and welldefined presentation of pulses representative of the thermo-couple devices being monitored.

It is, therefore, one object of the instant invention to provide novel switch means for use in monitoring electrical signal levels at a plurality of remote points.

Another object of the instant invention is to provide novel electronic solid state switch means for use in displaying the voltage levels received from a plurality of points upon a cathode ray display device.

Another object of the instant invention is to provide a novel electronic solid state switching means for displaying electrical data received from a plurality of remote points upon a cathode ray display device with the remote data being generated by thermo-couple devices being located at each remote point.

Still another object of the instant invention is to provide novel electronic solid state switch means for use in controlling the display device, which means is comprised of diode matrix means for sequentially coupling the remote points to the cathode ray display device under control of automatically recycling counter means, which, in turn, is continuously cycled under control of a free-running oscillator means, and wherein the electrical data being sequenced is coupled to the input of the cathode ray display means through NOR gate means.

These and other objects of the instant invention will become apparent when reading the accompanying description and drawings, in which:

FIGURE 1 is a block diagram showing the electronic solid state switching means of the instant invention.

FIGURE 2 is a schematic diagram of the oscillator means shown in block diagram form in FIGURE 1.

FIGURE 3 shows a plurality of waveforms for describing the operation of the oscillator of FIGURE 2.

FIGURE 4 is a schematic diagram showing one typical flip-flop stage of the electronic counter shown in block diagram form in FIGURE 1.

FIGURE 5 shows a Truth Table for a two-stage electronic counter means.

FIGURE 6 is a schematic diagram of the diode matrix shown in block diagram form of FIGURE 1.

FIGURE 7 is a slightly modified form of Truth Table relative to the Truth Table of FIGURE 5.

Figure 8:
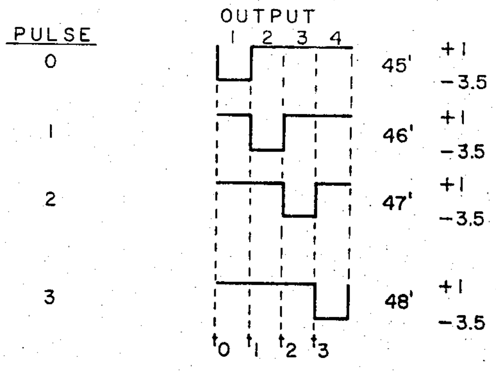
FIGURE 8 shows a plurality of waveforms provided for the purpose of describing the operation of the diode matrix of FIGURES 1 and 6.

Referring now to the drawings, FIGURE 1 shows the switching means shown in accordance with the principles of the instant invention with the major elements thereof being portrayed in block diagram form. The switching device of the instant invention is comprised of oscillator means 11 which is an electronic solid state device designed to generate pulses at a predetermined repetition rate, as will be more fully described.

The output of the oscillator means is impressed upon the input of an electronic counter 12 which, in turn, is comprised of a plurality of bi-stable flip-flop stages connected in such a manner as to be capable of generating a cumulative count, the value of which is based upon a number of stages provided in the counter. For example, in the case where the counter 12 is provided with six stages, a total cumulative count of 64 is produced. In the case where the counter is provided with two flip-flop stages, a total cumulative count of four may be obtained. Once the counter reaches its maximum count and since the oscillator means 11 is designed to operate continuously, the counter means 12 will recycle and automatically begin a new count when pulsed by oscillator 11 at the completion of each total cumulative count.

While not shown in FIGURE 1, each stage of multi-stage counter 12 has two output terminals. These output terminals are electrically connected to associated input terminals provided in a diode matrix means 13. The diode matrix means 13, as will be more fully described with reference to FIGURE 6, is basically comprised of a plurality of input terminals equal in number to the output terminals of multi-stage counter 12 and designed to receive the binary level of the output terminal of multi-stage counter 12 with which it is associated.

Diode matrix 13 is further provided with a plurality of output terminals equal in number to the input terminals and connected with the input terminals in a selective manner by suitable diode means which are arranged in accordance with a Truth Table to be more fully described so as to establish the sequence at which the output terminals of the diode matrix will be pulsed. The basic function of diode matrix 13 is to cause only one output terminal of the matrix to be at the binary 1 level, while the remaining output terminals are at the binary zero level, and to cause each output terminal to be at the binary 1 level in a predetermined sequence.

The output terminals of diode matrix 13 are coupled to the inputs of gates which are associated with a thermo-couple device and control the connection of the thermo-couple devices to the next stage in the section as designated by number 14. The gates operate so as to remain closed until pulsed by a binary 1 level signal since only one output terminal of diode matrix 13 is at the binary 1 level at any given instant, which output terminal opens its associated gate in section 14 so as to couple its associated thermo-couple device to the next stage 15. The remaining output terminals of diode matrix 13 being at the binary zero level, cause the remaining gates in section 14 to remain closed, thereby blocking the thermo-couple devices from connection with the next stage.

The output of each gate in section 14 is coupled to one input of a multi-input NOR gate device identified as NOR gate logic section 15. This section combines all of the outputs of the thermo-couple and thermo-couple gate section 14 into the single NOR gate device to form a two-wire output to the cathode ray display device 16. Since only one thermo-couple gate is open at any given instant, and since the remaining thermo-couple gates are closed at this instant, the combining of all outputs of section 14 into one NOR gate section does not cause more than one thermo-couple output to be connected to the cathode ray display device 16.

The cathode ray display device 16 may be any suitable device that shows an oscilloscope means capable of making repetitive sweeps across the face of the display device at a regular repetition rate which rate is in synchronism with the frequency rate of oscillator 11. The input of the cathode ray display device receives the thermo-couple voltage levels from section 14 through the NOR gate logic section 15 and operates to display a plurality of signal pulses, the lights or amplitudes of which represent the voltage levels of each thermo-couple device, which in turn represents a temperature level. Thus, by providing a suitable oscillator means 11 operating at a predetermined frequency and a counter means 12 of suitable stages, it is possible to portray any predetermined number of thermo-couple voltages upon the face of the cathode ray display device 16 within each sweep of the screen of the cathode ray device.

The oscillator 11 will generate repetitive pulses at a frequency which is compatible with the display device 16. In one preferred embodiment, the repetition frequency is 320 cycles per second. These pulses will trigger a multi-stage binary counter of six stages which will reach a cumulative count of 64. While a count of 50 is all that is needed, it is suitable to let the counter run out to the full count of 64 rather than decimally coding the counter to recycle at the count of 50. This binary coded signal is then fed to the diode matrix 13 which sequentially selects the thermo-couple devices to be observed. The outputs of the diode matrix 13 are then fed to the NOR logic section 15 which provides a two-wire output wired to pulse the cathode ray display device 16. While the cathode ray display device has been employed in the preferred embodiment, it should be understood that any other suitable display device may be employed without departing from the scope of the instant invention.

The oscillator circuit 11 is shown in schematic form in FIGURE 2 and is comprised of a unijunction transistor 17 which has the property of being cut off until its emitter 18 attains a predetermined voltage level. That voltage level is the intrinsic stand-off ratio $\eta$ times the supply voltage 19. In the unijunction transistor employed in the preferred embodiment, the ratio was found to lie within the range of 0.43 to 0.57. While this is a wide operating range, its limits are not important since the stability of the oscillator circuit is the only important factor.

FIGURE 3 shows two waveform plots 20 and 21 which represent the waveforms at the emitter 18 and the output terminal 22, respectively, of the oscillator 11.

The operation of oscillator 11 is as follows:

Capacitor 23, which is connected between emitter electrode 18 and ground potential 24, charges up towards supply voltage 19 through resistor 25. When the capacitor 23 charges to the voltage level $V_p$, shown by dotted line 26 of plot 20 of FIGURE 3, this causes the unijunction transistor 17 to begin conduction since this level represents the firing point or threshold voltage level of the transistor.

The conduction of transistor 17 causes capacitor 23 to discharge so that it rapidly drops to the voltage level $V_v$ represented by the dashed line 27 in plot 20 of FIGURE 3. This voltage level is the valley voltage of the transistor 17. At this time, the operation is repeated with the capacitor 23 again charging to the firing voltage level represented by dotted line 26.

With reference to plot 21 of FIGURE 3, it can be seen that the output voltage at terminal 22 remains at +6 volts until transistor 17 fires (i.e. conducts) and then substantially instantaneously drops to a voltage level which is dependent upon the resistance values of resistors 28, 29, $RB_2$ and $RB_1$. Thus, very sharp negative going pulses 30 are provided (which, however, are positive at all times) which pulses are employed to trigger the next stage of system 11.

By providing an adjustable potentiometer for the resistance element 25 this will allow a fine frequency control adjustment in order to properly interrelate the frequency of oscillator 11 to the sweep frequency of the display device 16.

FIGURE 4 shows in schematic form one flip-flop stage 12*a* of the multi-stage counter circuit 12 of FIGURE 1, it being understood that the remaining stages of the counter are substantially identical in design and function to the flip-flop stage 12*a* shown in the figure. The flip-flop circuit 12*a* is comprised of first and second transistor members Q1 and Q2 which are cross-coupled so that the collector of transistor Q1 is coupled to the base of transistor Q2 through the parallel RC elements and with the collector of transistor Q2 is connected to the base of transistor Q1 through the parallel R1C1 elements. The flip-flop stage 12*a* has two stable positions at its output terminal which is the collector of transistor Q2. This output terminal has the two stable states of −4.5 and +4.5 volts which represent the binary one and binary zero states, respectively. Considering the flip-flop stage 12*a* as the first, or the input stage of the counter 12, its input terminal 12*b* couples the output of oscillator 11 to the base electrodes of transistors Q1 and Q2 through capacitor C3 and diodes D1 and D2, respectively. Each negative going pulse from oscillator 11 acts to alter the binary level of the output of stage 12*a*. The output terminal is connected through a capacitor C4 to the input stage of the next flip-flop which, as previously described, is substantially identical in design and function to the stage 12*a* shown.

FIGURE 5 shows the Truth Table for a counter comprised of two stages. It should be understood that Truth Tables for a greater number of stages would be substantially identical in makeup. The vertical column of the Truth Table of FIGURE 5 represents the pulses generated by the oscillator circuit 11 and the horizontal column designates the four transistors Q1–Q4 which would make up a two-stage counter. It should be noted that the common point of flip-flop stage 12*a* and hence of all other flip-flop stages which comprise the counter 12 are returned to a + voltage level preferably +6 volts for suitable operation of the diode matrix, in a manner to be more fully described.

As can be seen upon the occurrence of the first pulse, transistors Q1 and Q4 of the two-stage counter are in binary 1 state. The occurrence of the second pulse cause all four transistors to change states such that transistors Q2 and Q3 move to the binary 1 state with transistors Q1 and Q4 moving to the binary zero state. Upon the occurrence of pulse three, transistor Q1 moves to the binary 1 state, Q2 to the binary zero state ad transistors Q3 and Q4 are unaffected by the occurrence of this pulse. Subsequent operations of the counter and hence development of the Truth Table become obvious at this point.

Outputs are taken from the collectors of both transistors comprising each flip-flop stage 12*a* of counter 12 and are impressed upon the diode matrix 13 which is shown in schematic form in FIGURE 6. The diode matrix 13 is comprised of a plurality of a plurality of horizontally aligned conductors 32 equal to the number of transistors comprising the counter 12. The outputs of each transistor in the multi-stage counter are impressed upon the resistor elements 33 which are connected to conductors 32. Diode matrix 13 is further comprised of a plurality of vertically aligned conductors 34 connected to a bus 35 which is at a negative voltage level through resistors 36. The horizontal conductors 32 are selectively coupled to the vertically aligned conductors 34 by the diode elements 37–44. The diode matrix 13, shown in FIGURE 6, is that which would be employed with a counter comprised of two stages. The binary states of the transistors Q1–Q4, together with the diode arrangement of diode elements 37–44 establish which of the outputs 45–48 will be in binary 1 state and which will be in binary zero state. The operation is such that only one of these outputs 45–48 will be at a negative voltage level with the remaining outputs being at a positive voltage level at any given instant.

Rearranging the Truth Table of FIGURE 5 in a slightly different manner, we arrive at the Truth Table shown in FIGURE 7 where the left-handmost column represents the pulse generated by the oscillator circuit 11 and where the topmost horizontal row represents the output states and hence the input voltage levels to the inputs of the diode matrix 13.

At pulse zero, the binary input states are 0101, which are presented to the input terminals A–B–C–D, respectively. Remembering that binary zero is +4.5 volts and binary 1 is −4.5 volts, it can be seen that the diodes 37 and 41 are reversed biased and hence are in the cut-off state. This makes the output 48 go to a −3.5 volt D.C. level. The remaining outputs 46–48 are at a +1 volt level at this time since at least one diode of the diodes 38–40 and 42–44 is in a conducting state. For example, diode 43 is conducting to place output terminal 46 at the + voltage level; diode 42 is conducting to place output 47 at the + voltage level; and diode 44 is conducting to place output 48 at the + voltage level. As the different binary code groups, shown in the Truth Table of FIG- URE 7, are impressed upon the inputs of diode matrix 13, it can be seen that one and only one output of the output terminals 45–48 is at the −3.5 voltage level at any given instant while the other three remaining outputs are at the +1 voltage level. The waveforms generated at the outputs of the diode matrix 13 are shown in FIGURE 8.

At time $t_0$ and upon the occurrence of pulse zero, the negative square pulse 45' appears at output terminal 45. At time $t_1$ and upon the occurrence of pulse one at the input of the diode matrix, output terminal 46 generates the negative square pulse 46'. The negative square pulses 47' and 48' are generated in a like manner and appear sequentially at the output terminals 47 and 48, respectively. Thus, it can be seen that negative pulse outputs appear at the output terminals 45–48 of diode matrix 13 in a sequential fashion. The common points of each flip-flop stage **12*a* in counter 12** are connected to a positive voltage level, preferably +6 volts D.C. rather than to ground potential in order to insure the fact that the output levels would go positive and negative at the output of each flip-flop stage rather than providing two negative voltage levels as the states of the flip-flop stages. The two positive and negative voltage levels which are shown in the waveforms of FIGURE 8 are employed to either saturate or cut off transistors of the next stage and hence must be at plus and minus voltage levels, respectively.

Figure 9:
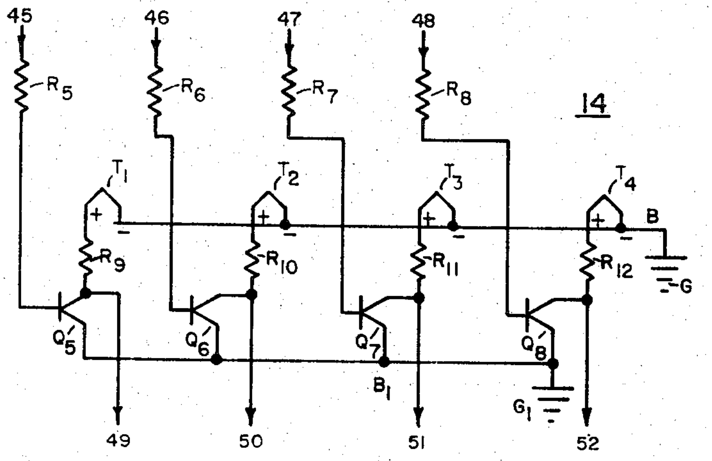
FIGURE 9 is a schematic diagram showing the thermo-couple and the thermo-couple gate section of FIGURE 1 in greater detail.

The outputs 45–48 of diode matrix 13 are each impressed upon an independent input terminal of the thermo-couple gates comprising the thermo-couple and thermo-couple gate section 14 which is shown in schematic form in FIGURE 9. In the exemplary embodiment 14 of FIGURE 9, which is designed to operate in conjunction with a two-stage counter and with the diode matrix 13 of FIGURE 6, four such thermo-coupled gate sections are employed and are comprised of the NPN transistors Q5–Q8, respectively. The negative square pulses of diode matrix 13 are impressed upon the base electrodes of transistors Q5–Q8, respectively, through the resistive elements R5–R8 respectively. The collector electrodes of each transistor Q5–Q8 is coupled through a resistor R9–R12, respectively, to the positive side of an associated thermo-couple element $T_1$–$T_4$, respectively. The negative side of each thermo-couple element is connected to ground G through a common bus B. The emitter electrodes of transistors Q5–Q8 are connected to ground G through a common bus B1. The transistors Q5–Q8 are NPN transistors which are fully saturated when their base electrodes are at a positive voltage level, placing their collector terminals substantially at ground voltage, since in full saturation the transistors Q5–Q8 have essentially zero impedance. If the voltage at the base of any of these transistors Q5–Q8 goes negative, the transistor has essentially infinite impedance, thus placing their associated output terminals 49–52 at a voltage level equal to the thermo-couple voltage.

Bearing in mind the manner in which the negative square pulses 45'–48' are generated, it can be seen that at any given instant only one input to transistors Q5–Q8 will be at the negative voltage level with the remaining three inputs being at the positive voltage level at this time. For example, at time $t_0$ the voltage upon the base of transistor Q5 is negative, while the voltages at the bases of transistors Q6–Q8, respectively, are positive. This causes transistors Q6–Q8 to be fully saturated and transistor Q5 to be at cut-off, thus placing the output terminal 49 to be at the thermo-couple voltage of thermo-couple element $T_1$ while the remaining outputs 50–52 will be at ground potential. At time $t_1$ output terminal 50 of transistor Q6 will be at thermo-couple voltage $T_2$ with the output terminals 49, 51 and 52 being at ground potential. Thus, each of the transistors Q5–Q8 are gated to cut-off in a sequential fashion under control of the diode matrix 13 thereby sequentially gating through the thermo-couple voltages of thermo-couple elements $T_1$–$T_4$ to the output terminals 49–52, respectively. At this point we now have a four-wire output of the thermo-couple voltages which must now be transformed into a two-wire output to feed the display device 16.

Figure 10:
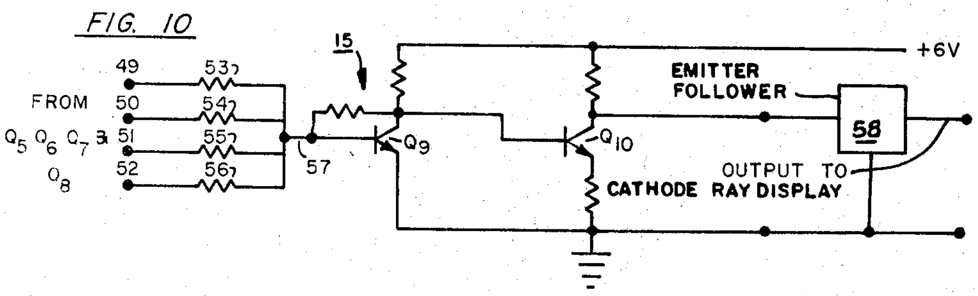
FIGURE 10 is a schematic diagram showing the NOR gate logic section of FIGURE 1.

FIGURE 10 shows the NOR gate logic section 15 in schematic form, which section is comprised of four input terminals connected to the outputs 49–52, respectively, of the thermo-couple and thermo-couple gate section 14 and join these input terminals through resistor branches 53–56, respectively, to a common point 57 which is coupled to the base of transistor Q9. As the transistors Q5–Q8 of thermo-couple gate section 14 are sequentially cut off the thermo-couple voltage of the cut-off state is coupled to one of the resistor branches 53–56 with the remaining three branches being at ground potential. This thereby puts the base of transistor Q9 at a voltage level representative of the thermo-couple voltage. Although the output of each thermo-couple is negative going when it is gated through the NOR gate section 15 (though positive at all times), the transistor Q10 is provided to invert this to a positive going voltage through the inverter action of the transistor stage Q10. This thereby transforms the four terminal output of the thermo-couple section 14 into a two-terminal output for feeding the display device 16, which terminals are connected to the collector and ground across transistor Q10. The outputs of each thermo-couple device $T_1$–$T_4$ are thereby impressed upon the input of the cathode display device 16 in sequential fashion so that these pulses will be generated on the screen of the display device for each horizontal sweep of the cathode ray display device. Considering FIGURE 9, whereas the thermo-couple elements T–$T_4$ are shown in close proximity to one another, it should be understood that these elements may be positioned at points in the reactor unit (not shown) which are remote from one another with the positioning of the thermo-couple elements being dependent only upon the locality at which the temperature readings are desired.

Due to the capacitive loading of the display device 16 to the electronic switching system comprised of elements 11–15 of FIGURE 1, it has been found that by coupling an emitter-follower stage 58 between the output of logic section 15 and the input of the cathode display device 16 (see FIGURE 10), this capacitive loading effect was minimized. Emitter follower 58 is shown connected between the output of Q10 and oscilloscope 16 (see also FIGURE 1).

Figure 11:
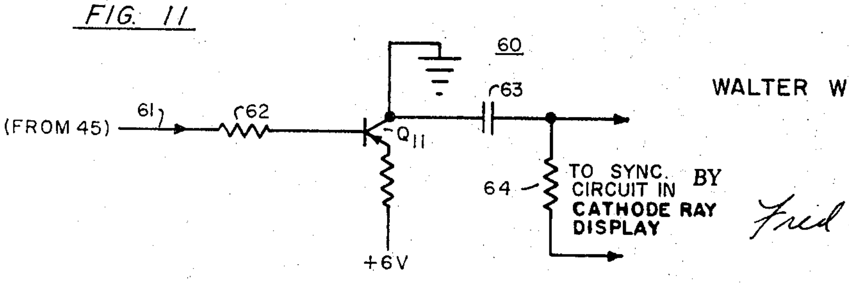
FIGURE 11 is a schematic diagram showing the manner in which the zero count position of the diode matrix is electrically connected to the sync circuit of the cathode ray display device.

In order to fully synchronize the operation of the solid state electronic switch means with the display device the circuit 60 of FIGURE 11 is provided. The circuit is connected with its input terminal 61 being connected to the zero output terminal 45 of the diode matrix 13, which signal is impressed through a resistor element 62 upon the base of transistor Q11 which has its collector electrode connected through the RC elements 64 and 63, respectively, to the sync circuit of the display device 16. Thus, upon the occurrence of each zero pulse or at the beginning of each horizontal sweep of the cathode ray tube display device, the display device sync circuit is triggered by the zero pulse from the diode matrix with this occurring at the beginning of each sweep cycle so as to insure synchronism between the solid state switch and the display device. In the embodiment employing the circuit of FIGURE 11, the counter 12 is preferably provided with six stages to develop a count of 64 with the diode matrix being designed to generate seven sequentially formed negative square pulses in the same manner described with reference to FIGURE 8. In applications where greater than four thermo-couple elements are to be monitored and displayed, additional NOR gate logic circuits may be added into the logic section 15, it being found preferable to couple no more than five independent thermo-couple inputs to any one logic section in order to provide suitable monitoring results.

In cases where it is either preferred or required to tie the thermo-couple elements to a common ground connection, it has been found preferable to ground the positive side of the thermo-couple elements $T_1$–$T_4$ to a common ground bus in order to avoid any interaction between the thermo-couple elements. In order to accommodate this change, the transistor gates Q5–Q8, shown in FIGURE 9, must be altered from NPN transistors to PNP transistors with the proper reversals also being made to diode elements and their polarities as well as the bias voltages of each stage of the switch system. Through the reversal of the polarities of bias voltages, diode polarities and substitution of PNP transistors for NPN transistors and vice versa, the system has been found to provide excellent results for monitoring and display purposes which is totally unaffected by either grounded or ungrounded thermo-couple elements.

It can be seen from the foregoing that the instant invention provides a novel electronic solid state circuit for the monitoring and display of thermo-couple elements and the like to provide continuous, reliable and trouble-free performance for extremely long operating periods. Whereas the instant invention describes solid state electronic circuitry for the monitoring and display of thermo-couple elements, it should be understood that other devices may likewise be so monitored and displayed with the only requirement being that devices which are so monitored each produce an analog voltage level representative of the condition which they are monitoring, there being no unique requirement that thermo-couple devices only may be so monitored.

Although there has been described a preferred embodiment of this novel invention, many variations and modifications will now be apparent to those skilled in the art. Therefore, this invention is to be limited, not by the specific disclosure herein, but only by the appended claims.

What is claimed is:

1. Electronic solid-state switching means for monitoring and displaying data from a plurality of remote locations comprising oscillator means for generating pulses at a constant predetermined repetition rate; electronic multistage counter means being stepped by said oscillator means; diode matrix means having a plurality of input means coupled to said counter means and having a plurality of output lines; said diode matrix means further comprising a plurality of diode means selectively coupled between its input means and its output terminals for sequentially placing only one output line in the binary ONE state at any given instant with the remaining output lines being at the binary ZERO state; a plurality of analog sensing means; display means; a plurality of gating means each having an output terminal being connected to an associated analog sensing means which normally shunts the output of its associated analog sensing means to ground; each gating means having a control terminal controlled by an associated output line of said diode matrix means for sequentially removing the shunt to ground for coupling its associated analog sensing means to said display means under control of said diode matrix means; said display means being coupled to said diode matrix means for synchronization by said diode matrix means; said display means being an oscilloscope for displaying the output of each analog sensing means in a repetitive manner.

2. The device of claim 1 wherein each of said sensing means is comprised of thermo-couple means each having an output terminal coupled to an output terminal of an associated gating means for generating a voltage representative of the temperature level in the immediate region of said thermo-couple means.

3. The device of claim 1 further comprising emitter follower transistor means; the input of said transistor means being coupled in common to all output terminals of said gating means; the output of said transistor means being coupled to said oscilloscope.

References Cited

UNITED STATES PATENTS

| | | | |
|---|---|---|---|
| 3,034,101 | 5/1962 | Loewe | 340—183 |
| 3,087,144 | 4/1963 | Bianchi | 340—183 |
| 3,120,758 | 2/1964 | Craddock | 340—184 |
| 3,274,576 | 9/1966 | Guignard | 340—183 |

THOMAS B. HABECKER, *Acting Primary Examiner.*

NEIL C. READ, *Examiner.*